United States Patent
Lee et al.

(10) Patent No.: US 12,236,605 B2
(45) Date of Patent: Feb. 25, 2025

(54) METHOD FOR DETECTING WHITE MATTER LESIONS BASED ON MEDICAL IMAGE

(71) Applicants: VUNO Inc., Seoul (KR); SEOUL NATIONAL UNIVERSITY HOSPITAL, Seoul (KR)

(72) Inventors: Dong Soo Lee, Seoul (KR); Hyunwoo Oh, Seoul (KR); Sejin Park, Yongin-si (KR); Jinkyeong Sung, Seoul (KR); Eunpyeong Hong, Seongnam-si (KR); Weon Jin Kim, Seoul (KR); Ki Woong Kim, Seoul (KR); Jong Bin Bae, Seoul (KR); Subin Lee, Seoul (KR); Jun Sung Kim, Seoul (KR)

(73) Assignees: VUNO Inc., Seoul (KR); SEOUL NATIONAL UNIVERSITY HOSPITAL, Seoul (KR)

( * ) Notice: Subject to any disclaimer, the term of this patent is extended or adjusted under 35 U.S.C. 154(b) by 504 days.

(21) Appl. No.: 17/533,858

(22) Filed: Nov. 23, 2021

(65) Prior Publication Data
US 2022/0172370 A1    Jun. 2, 2022

(30) Foreign Application Priority Data

Nov. 27, 2020    (KR) .......................... 10-2020-0162957

(51) Int. Cl.
*G06T 7/11*    (2017.01)

(52) U.S. Cl.
CPC ...... *G06T 7/11* (2017.01); *G06T 2207/10024* (2013.01); *G06T 2207/10088* (2013.01);
(Continued)

(58) Field of Classification Search
CPC ............ G06T 7/11; G06T 2207/10024; G06T 2207/10088; G06T 2207/20081;
(Continued)

(56) References Cited

U.S. PATENT DOCUMENTS

| 6,430,430 B1 * | 8/2002 | Gosche .................. G06T 7/155 128/923 |
| 9,818,212 B2 | 11/2017 | Jeon et al. |

(Continued)

FOREIGN PATENT DOCUMENTS

| JP | 2020-39507 A | 3/2020 |
| KR | 10-1754291 B1 | 7/2017 |

(Continued)

OTHER PUBLICATIONS

Y. Ho and S. Wookey, "The Real-World-Weight Cross-Entropy Loss Function: Modeling the Costs of Mislabeling," in IEEE Access, vol. 8, pp. 4806-4813, 2020, doi: 10.1109/ACCESS.2019.2962617 (Year: 2020).*

(Continued)

*Primary Examiner* — Santiago Garcia

(57) ABSTRACT

According to an embodiment of the present disclosure, a method of detecting a white matter lesion based on a medical image performed by a computing device is disclosed. The method may include: receiving a medical image including at least one brain region; and estimating a first white matter lesion and a second white matter lesion based on the medical image using a pre-trained neural network model.

12 Claims, 9 Drawing Sheets

(52) U.S. Cl.
CPC ............... *G06T 2207/20081* (2013.01); *G06T 2207/20084* (2013.01); *G06T 2207/30016* (2013.01); *G06T 2207/30096* (2013.01)

(58) Field of Classification Search
CPC . G06T 2207/20084; G06T 2207/30016; G06T 2207/30096; G06T 7/0012; G16H 30/40; G16H 30/20; G16H 50/50; G16H 50/70; A61B 5/0033; A61B 5/055; A61B 5/165; A61B 5/4088; A61B 6/032; A61B 6/5217; G06N 3/08
See application file for complete search history.

(56) References Cited

U.S. PATENT DOCUMENTS

| | | | | |
|---|---|---|---|---|
| 2011/0077533 | A1* | 3/2011 | Kamei | A61B 8/488 600/485 |
| 2017/0128032 | A1* | 5/2017 | Buchert | A61B 5/055 |
| 2017/0354630 | A1* | 12/2017 | Novas | A61K 9/485 |
| 2020/0077893 | A1 | 3/2020 | Shirai et al. | |
| 2020/0315455 | A1 | 10/2020 | Lee et al. | |
| 2023/0162339 | A1* | 5/2023 | Zhang | G06T 5/60 382/128 |

FOREIGN PATENT DOCUMENTS

| | | |
|---|---|---|
| KR | 10-2019-0105452 A | 9/2019 |
| KR | 10-2020-0055690 A | 5/2020 |

OTHER PUBLICATIONS

Decarli et al., "Anatomical Mapping of White Matter Hyperintensities (WMH)," *Stroke,* 36:50-55, 2005.

Hong et al., "Two-step deep neural network for segmentation of deep white matter hyperintensities in migraineurs," *Computer Methods and Programs in Biomedicine,* 183:9 pages, 2020.

Griffanti et al., "Classification and characterization of periventricular and deep white matter hyperintensities on MRI: A study in older adults," *NeuroImage,* 170:174-181, 2018.

Chutinet et al., "White Matter Disease as a Biomarker for Long-Term Cerebrovascular Disease and Dementia", Curr Treat Options Cardio Med 16(292), Feb. 5, 2014. (12 pages). DOI: 10.1007/s11936-013-0292-z.

Sundaresan et al., "Triplanar ensemble U-Net model for white matter hyperintensities segmentation on MR images," bioRxiv, Jul. 26, 2020. DOI: https://doi.org/10.1101/2020.07.24.219485.

* cited by examiner

METHOD FOR DETECTING WHITE MATTER LESIONS BASED ON MEDICAL IMAGE

CROSS-REFERENCE TO RELATED APPLICATIONS

This application claims priority to and the benefit of Korean Patent Application No. 10-2020-0162957 filed in the Korean Intellectual Property Office on Nov. 27, 2020, the entire contents of which are incorporated herein by reference.

BACKGROUND

Technical Field

The present disclosure relates to a method of processing a medical image, and more particularly, to a method of detecting a body organ existing in a medical image for each area by using a neural network and segmenting the lesion.

Description of the Related Art

Medical images are data that enables people to understand physical states of various organs in the human body. The medical image includes a digital radiographic image (X-ray), a Computed Tomography (CT) image, a Magnetic Resonance Imaging (MM) image, or the like.

Research on a method of segmenting body organs for each area to assist in the diagnosis of body organs included in medical images has been steadily continuing.

U.S. Pat. No. 9,818,212 discloses a method of processing magnetic resonance imaging for lesion detection.

BRIEF SUMMARY

The inventors of the present disclosure have appreciated that some of the approaches in the related art have problems in that the approaches do not adequately reflect the clinical meaning and influence of diseases related to body organs, such as a brain, including numerous detailed areas. For example, in the case of dementia, it is one of the clinically important issue to distinguish vascular dementia from Alzheimer's dementia. However, the approaches in the related art do not provide appropriate results for distinguishing vascular dementia from Alzheimer's dementia. Accordingly, the inventors have proposed one or more embodiments that resolves one or more technical problems in the related art including the problem identified by the inventors.

One or more embodiments of the present disclosure provide a method of detecting and segmenting a cerebral white matter lesion included in a medical image and providing a user with the detected and segmented cerebral white matter lesion.

The present disclosure further discloses an example method for detecting white matter lesions based on medical image, performed by a computing device, the method including: receiving a medical image including at least one brain region; and generating information for estimating a first white matter lesion and a second white matter lesion based on the medical image using a pre-trained neural network model.

Alternatively, the first white matter lesion may be estimated based on periventricular white matter hyperintensity. Further, the second white matter lesion may be estimated based on deep white matter hyperintensity.

Alternatively, the generating the information for estimating the first white matter lesion and the second white matter lesion may include: extracting a brain region including white matter from the medical image, wherein the brain region is a region from which a bone region of the brain has been removed; generating first information for estimating the first white matter lesion based on the extracted brain region, using a first lesion estimation module included in the neural network model; and generating second information for estimating the second white matter lesion based on the extracted brain region, using a second lesion estimation module included in the neural network model.

Alternatively, the neural network model may be trained based on an image in which true label is greater than a predetermined (or selected) number of pixels among input images.

Alternatively, the neural network model may be trained using a cross-entropy loss function with smoothed weights based on a log function.

Alternatively, the method may further include: generating a first mask including information for the first white matter lesion; and generating a second mask including information for the second white matter lesion.

Alternatively, the method may further include generating a third mask including information for an entire lesion in which a white matter is degenerated, by matching the first mask and the second mask.

Alternatively, the method may further include generating first volume information for the first white matter lesion or second volume information for the second white matter lesion, based on information for voxel dimension of the medical image and a number of predetermined units for each of the estimated lesions.

Alternatively, the method may further include calculating a severity of each of the first white matter lesion or the second white matter lesion, based on an index indicating a severity of a white matter degeneration.

Alternatively, the method may further include generating a user interface including a mask generated based on each of the first white matter lesion and the second white matter lesion, volume information, and degeneration severity information. In this case, the user interface may include at least one of followings: a first region for displaying an image of a lesion in which a white matter is degenerated, based on the mask generated based on each of the first white matter lesion and the second white matter lesion; or a second region for displaying at least one of the volume information and the degeneration severity information.

Alternatively, each of the first white matter lesion and the second white matter lesion may be displayed in different colors, in the first region.

Another embodiment of the present disclosure discloses a computer program stored in a computer readable storage medium. When the computer program is executed in one or more processors, the computer program causes following operations for detecting a white matter lesion based on a medical image to be performed, the operations including: receiving a medical image including at least one brain region; and generating information for estimating a first white matter lesion and a second white matter based on the medical image by using a trained neural network.

Another embodiment of the present disclosure discloses a computing device for detecting white matter lesions based on a medical image. The device may include: a processor including at least one core; a memory including program codes executable in the processor; and a network unit for receiving a medical image including at least one brain region, in which the processor may be configured to generate information for estimating a first white matter lesion and a second white matter lesion based on the medical image using a pre-trained neural network model.

Another embodiment of the present disclosure discloses a user terminal providing a user interface. The user terminal may include: a processor including at least one core; a memory; a network unit for receiving a user interface including information for a lesion in which a white matter is degenerated, from a computing device; and an output unit for providing the user interface, in which the user interface may include at least one of followings: a first region for displaying an image of the lesion in which the white matter is degenerated, based on the mask generated by the computing device based on each of a first white matter lesion and a second white matter lesion; or a second region for displaying at least one of volume information and degeneration severity information, which are generated by the computing device based on each of the first white matter lesion and the second white matter lesion.

The present disclosure may provide a method of detecting and segmenting a cerebral white matter lesion included in a medical image and providing the detected and segmented cerebral white matter lesion to a user.

DETAILED DESCRIPTION

Figure 1:
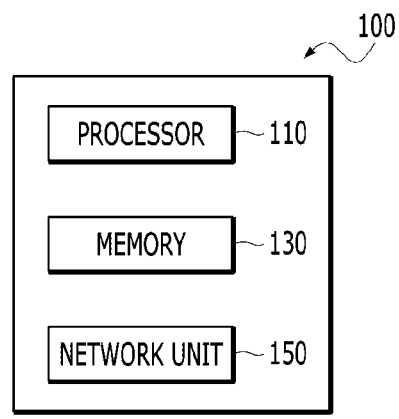
FIG. 1 is a block diagram illustrating a computing device for detecting a white matter lesion based on a medical image according to an embodiment of the present disclosure.

Various embodiments are described with reference to the drawings. In the present specification, various descriptions are presented for understanding the present disclosure. However, it is obvious that the embodiments may be carried out even without a particular description.

Terms, "component," "module," "system," and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or." That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated in context, the singular shall be construed to generally mean "one or more" in the present specification and the claims.

The term "at least one of A and B" should be interpreted to mean "the case including only A," "the case including only B," and "the case where A and B are combined."

Those skilled in the art shall recognize that the various illustrative logical blocks, configurations, modules, circuits, means, logic, and algorithm operations described in relation to the embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented embodiments is provided so as for those skilled in the art to use or carry out the present disclosure. Various modifications of the embodiments will be apparent to those skilled in the art. General principles defined herein may be applied to other embodiments without departing from the scope of the present disclosure. Therefore, the present disclosure is not limited to the embodiments presented herein. The present disclosure shall be interpreted within the broadest meaning range consistent to the principles and new characteristics presented herein.

In the meantime, the term "image" or "mage data" used throughout the detailed description and the claims of the present disclosure refer to multidimensional data composed of discrete image elements (for example, pixels in a 2-dimensional image), and in other words, is the term referring to a target visible to the eye (for example, displayed on a video screen) or a digital representation of the target (for example, a file corresponding to a pixel output of a CT or MRI detector).

For example, "image" or "video" may be a medical image of a subject collected by Computed Tomography (CT), Magnetic Resonance Imaging (MRI), ultrasonic rays, or other predetermined medical imaging systems publicly known in the art of the present disclosure. The image is not necessarily provided in a medical context, but may also be provided in a non-medical context, such as X-ray imaging for security screening.

Throughout the detailed description and the claims of the present disclosure, the "digital Imaging and Communications in Medicine (DICOM)" standard is a term collectively referring to various standards used in digital imaging expression and communication in medical devices, and the DICOM standard is published by the allied committee formed by the American College of Radiology (ACR) and American National Electrical Manufacturers Associations (NEMA).

Throughout the detailed description and the claims of the present disclosure, a "Picture Archiving and Communication System (PACS)" is a term that refers to a system that stores, processes, and transmits images in accordance with the DICOM standard, and medical images obtained by using digital medical imaging equipment, such as X-ray, CT, and MRI, may be stored in the DICOM format and transmitted to terminals inside and outside a hospital through a network, and a reading result and a medical record may be added to the medical image.

FIG. 1 is a block diagram illustrating a computing device for detecting a white matter lesion based on a medical image according to an embodiment of the present disclosure.

The configuration of a computing device 100 illustrated in FIG. 1 is merely a simplified example. In the embodiment of the present disclosure, the computing device 100 may include other configurations for performing a computing environment of the computing device 100, and only some of the disclosed configurations may also configure the computing device 100.

The computing device 100 may include a processor 110, a memory 130, and a network unit 150 (or network circuit 150).

The processor 110 may be formed of one or more cores, and may include a processor, such as a central processing unit (CPU), a general purpose graphics processing unit (GPGPU), and a tensor processing unit (TPU) of the computing device, for performing a data analysis and deep learning. The processor 110 may read a computer program stored in the memory 130 and process data for machine learning according to an embodiment of the present disclosure. According to the embodiment of the present disclosure, the processor 110 may perform calculation for training a neural network. The processor 110 may perform a calculation, such as processing of input data for training in Deep Learning (DL), extraction of a feature from input data, an error calculation, and updating of a weight of the neural network by using backpropagation, for training the neural network. At least one of the CPU, GPGPU, and TPU of the processor 110 may process training of a network function. For example, the CPU and the GPGPU may process training of the network function and data classification by using a network function together. Further, in the embodiment of the present disclosure, the training of the network function and the data classification by using a network function may be processed by using the processors of the plurality of computing devices together. Further, the computer program executed in the computing device according to the embodiment of the present disclosure may be a CPU, GPGPU, or TPU executable program.

The processor 110 may receive a medical image and predict a lesion of a body organ existing in the medical image through a pre-trained neural network model. For example, the processor 110 may predict a white matter lesion existing in a brain region based on a T2-FLAIR magnetic resonance (MR) image in which the brain is a target organ by using the neural network model. The processor 110 may detect a hyper-intensity signal of the white matter from the T2-FLAIR MR image by using the neural network model, and predict the white matter lesion based on the hyper-intensity signal of the detected white matter.

The processor 110 may classify the plurality of lesions based on a degeneration location of the white matter existing in the medical image by using the neural network model. The processor 110 may perform segmentation on the plurality of lesions divided by using the neural network model. For example, the processor 110 may estimate each of the two lesions divided based on the degeneration location of the white matter based on the T2-FLAIR MR image by using the neural network model. In this case, each of the two lesions may be estimated based on the hyper-intensity signal of the white matter detected from the T2-FLAIR MR image. The processor 110 may extract information about the two lesions from the T2-FLAIR MR image by using the neural network model. The processor 110 may generate at least one mask including the information about the two lesions based on the T2-FLAIR MR image. Herein, the mask may mean data including all of the information (for example, location information and shape information) about the lesion, as well as a marker indicated on the image.

The processor 110 may generate a user interface based on the information about the plurality of lesions estimated by using the neural network model. The user interface is a computing environment for interworking between the computing device and a user, and may include a screen configuration for outputting information about the white matter lesion predicted by the processor 110. For example, the user interface may include various regions for displaying a mask including location information, shape information and the like about the plurality of white matter lesions, volume information about the plurality of white matter lesions, severity index information about the plurality of white matter lesions, and the like. The information displayed on each of the regions included in the user interface may be corrected, changed, or added by an external input applied from the user through a terminal to which the user interface is to be provided and the like.

According to the embodiment of the present disclosure, the memory 130 may store a predetermined type of information generated or determined by the processor 110 and a predetermined type of information received by a network unit 150.

According to the embodiment of the present disclosure, the memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device 100 may also be operated in relation to web storage performing a storage function of the memory 130 on the Internet. The description of the foregoing memory is merely illustrative, and the present disclosure is not limited thereto.

The network unit 150 according to the embodiment of the present disclosure may use a predetermined form of a publicly known wire/wireless communication system.

The network unit 150 may receive the medical image in which the organ of the body is expressed from a medical image photographing system. For example, the medical image in which the organ of the body is expressed may be data for training or data for inferring of the neural network model trained with the two-dimensional characteristic or the three-dimensional characteristic. The medical image in which the organ of the body is expressed may be the three-dimensional T1 MR image including at least one brain region. The medical image in which the organ of the body is expressed is not limited to the foregoing example, and may include all of the images, such as X-ray images and CT images, related to the organ of the body obtained through the photographing.

The network unit 150 may transceive information processed by the processor 110, the user interface, and the like through communication with other terminals. For example, the network unit 150 may provide the user interface generated by the processor 110 to a client (for example, a user terminal). Further, the network unit 150 may receive the external input of the user applied to the client and transfer the received external input to the processor 110. In this case, the processor 110 may process the operations of output, correction, change, addition, and the like of the information provided through the user interface based on the external input of the user received from the network unit 150.

In the meantime, the computing device 100 according to the embodiment of the present disclosure is a computing system for transceiving information with the client through communication and may be a server. In this case, the client may be a predetermined form of terminal accessible to the server. For example, the computing device 100 that is the server may receive a medical image from a medical image photographing terminal and predict a lesion, and provide the user terminal with the user interface including the predicted result. The user terminal may output the user interface received from the computing device 100 that is the server, and input or process information through interaction with the user.

The user terminal may display the user interface provided for providing the prediction result for the white matter lesion transmitted from the computing device 100 that is the server. Although not separately illustrated, the user terminal may include a network unit, a processor, a memory, an output unit (or output circuit), and an input unit (or input circuit).

Figure 2:
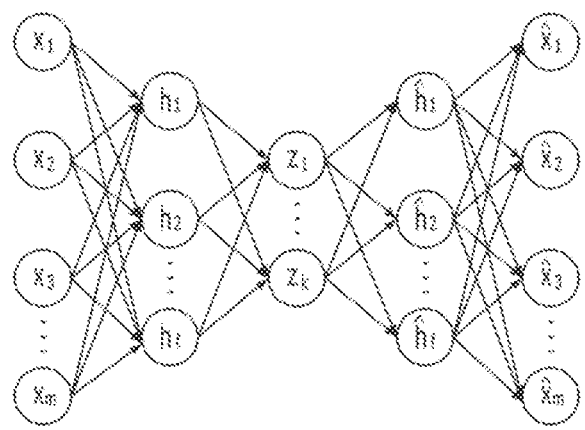
FIG. 2 is a schematic diagram illustrating a network function according to the embodiment of the present disclosure.

FIG. 2 is a schematic diagram illustrating a network function according to the embodiment of the present disclosure.

Throughout the present specification, the meaning of a calculation model, a nerve network, the network function, and the neural network may be interchangeably used. The neural network may be formed of a set of interconnected calculation units which are generally referred to as "nodes." The "nodes" may also be called "neurons." The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weights between the links are different, the two neural networks may be recognized to be different from each other.

The neural network may consist of a set of one or more nodes. A subset of the nodes forming the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed from the initial input node to a corresponding node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network Siamese network, and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of reducing or minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
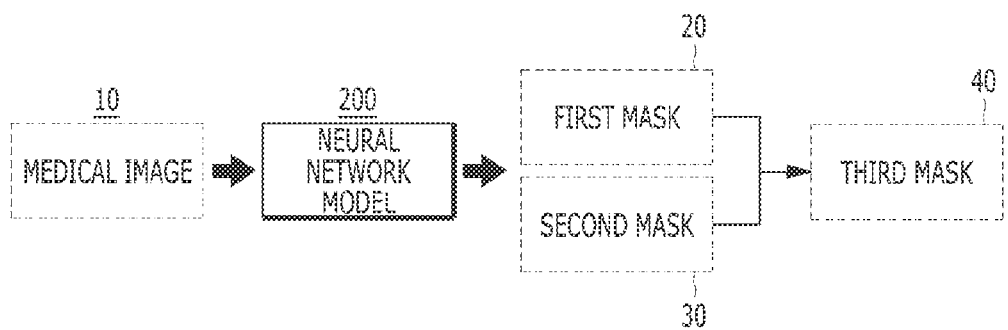
FIG. 3 is a block diagram illustrating a process of performing segmentation of the computing device according to the embodiment of the present disclosure.
Figure 4:
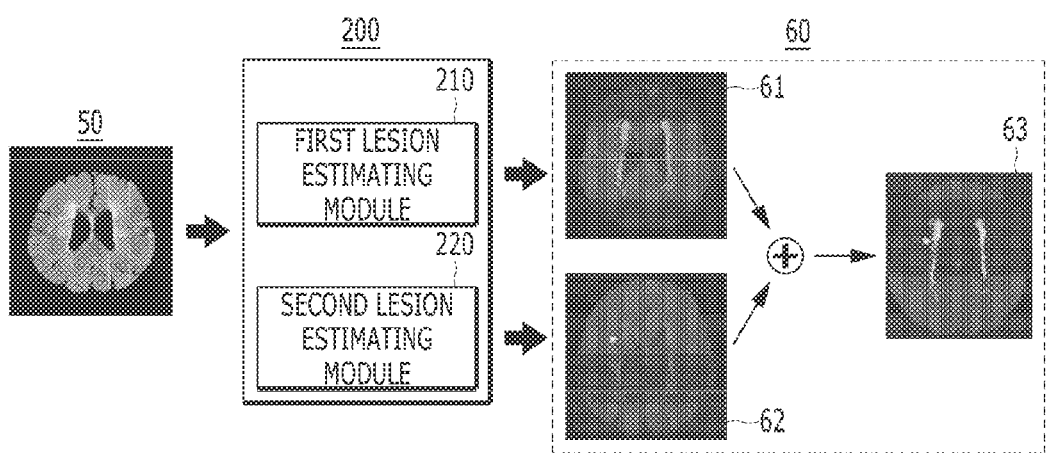
FIG. 4 is a block diagram illustrating a process of performing segmentation of the computing device according to an alternative embodiment of the present disclosure.

FIGS. 3 and 4 are block diagrams illustrating a process of performing segmentation of the computing device according to the embodiment of the present disclosure.

Referring to FIG. 3, the processor 110 of the computing device 100 according to the embodiment of the present disclosure may use a medical image 10 including at least one brain region as an input of a neural network model 200 predicting a white matter lesion. In this case, the processor 110 may use data received through the network unit 150 as the medical image 10 input to the neural network model 200 as it is. The processor 110 may also use data generated through separate processing for the data received through the network unit 150 as the medical image 10 input to the neural network model 200. For example, the medical image 10 corresponding to the input of the neural network model 200 may be a two-dimensional T2-FLAIR MR image received through the network unit 150. When the data received through the network unit 150 is a three-dimensional MR image, the processor 110 may generate a two-dimensional T2-FLAIR MR image from the three-dimensional MR image, and then use the two-dimensional T2-FLAIR MR image generated from the three-dimensional MR image as the medical image 10 input to the neural network model 200.

The processor 110 may estimate a white matter lesion by detecting a hyper-intensity signal of a white matter from the medical image 10 by using the neural network model 200. The processor 110 may estimate a first white matter lesion and a second white matter lesion based on the hyper-intensity signal of the white matter by using the neural network model 200. For example, the neural network model 200 may receive the two-dimensional T2-FLAIR MR image and extract information on the first white matter lesion and the second white matter lesion on the brain region based on the hyper-intensity signal of the white matter. In this case, the first white matter lesion may be estimated based on the hyper-intensity signal of a periventricular white matter. The second white matter lesion may be estimated based on the hyper-intensity signal of a deep white matter. The hyper-intensity signal of the periventricular white matter is clinically associated with cognitive dysfunction, decrease cerebral blood flow, Alzheimer's dementia, and the like, and the hyper-intensity signal of the deep white matter is associated with mood disorders (for example, depression, manic depressive disorder, and migraine) and vascular dementia. Therefore, as described above, when the processor 110 divides the white matter lesion into two lesions and estimates the white matter lesion, data for diagnosing the brain disease to which the clinical difference is reflected may be provided to the user. That is, the user may more effectively determine the vascular dementia and the Alzheimer's dementia by using the data predicted by dividing the lesion into the first white matter lesion and the second white matter lesion by the processor 110.

In the meantime, the neural network model 200 according to the embodiment of the present disclosure may include a neural network structure for segmenting the white matter lesion existing in the medical image. For example, the neural network model 200 may include a U-NET-based neural network. The neural network model 200 may use the neural network in which a DenseNet structure is applied to the U-NET-based architecture is applied to decrease the number of training parameters and efficiently save the memory. The foregoing description is merely illustrative, and the structure of the neural network model 200 is not limited to the foregoing example.

The neural network model 200 may use a cross-entropy loss function to which a smoothened weight is applied based on a log function in order to optimize the training for performing a task that is the segmentation for the white matter lesion. For example, in the case where the cross-entropy loss function to which a simple weight is applied is used, the hyper-intensity signal of the white matter labeled to the input image used for the training of the neural network model 200 is considerably sparse, a problem may arise in which a simple weight is applied too large. Accordingly, in the case of the neural network model 200 using the hyper-intensity signal of the white matter, in order to solve the foregoing problem, the cross-entropy loss function in which the extreme weight is smoothened may be used based on the log function.

Referring to FIG. 3, the processor 110 may generate a first mask 20 including information about the first white matter lesion estimated through the neural network model 200 based on the hyper-intensity signal of the white matter. Further, the processor 110 may generate a second mask 30 including information about the second white matter lesion estimated through the neural network model 200 based on the hyper-intensity signal of the white matter. That is, the processor 110 may generate each of the first mask 20 and the second mask 30 for the white matter lesion to which the clinical difference of the brain disease is reflected. For example, the first mask 20 may be image data including information about the first white matter lesion in which the hyper-intensity signal of the periventricular white matter is displayed. The second mask 30 may be image data including information about the second white matter lesion in which the hyper-intensity signal of the deep white matter is displayed.

The processor 110 may also generate a third mask 40 in which the information included in the first mask 20 and the second mask 30 are combined for providing a prediction result for the entire white matter lesions. The third mask 40 may be data including the information about the white matter lesions in which all of the hyper-intensity signals of the white matter existing in the medical mage 10 are displayed. For example, the processor 110 may generate the third mask 40 by matching the second mask 30 in which 2 is allocated as a pixel value of the hyper-intensity signal of the deep white matter on the first mask 20 in which 1 is allocated as a pixel value of the hyper-intensity signal of the periventricular white matter and 0 is allocated as a pixel value of a background. The first mask 20 and the second mask 30 have the same space and size, so that the processor 110 may generate the third mask 40 by matching the two masks 20 and 30 only with the difference in the pixel value. Therefore, in the third mask 40, 2 is allocated as the pixel value of the hyper-intensity signal of the deep white matter, 1 is allocated as the pixel value of the hyper-intensity signal of the periventricular white matter, and 0 is allocated as the pixel value of the background, so that the information about all of the white matter lesions may be displayed on the third mask 40.

Referring to FIG. 4, the neural network model 200 according to an alternative embodiment of the present disclosure may include individual modules 210 and 220 for estimating the first white matter lesion and the second white matter lesion. The neural network model 200 may include a first lesion estimating module 210 for segmenting the white matter lesion based on the hyper-intensity signal of the periventricular white matter and a second lesion estimating module 220 for segmenting the white matter lesion based on the hyper-intensity signal of the deep white matter. For example, the neural network model 200 may receive a T2-FLAIR MR image 50, and predict the first white matter lesion by operating the first lesion estimating module 210 and predict the second white matter lesion by operating the second lesion estimating module 220. The first lesion estimating module 210 may detect the hyper-intensity signal of the periventricular white matter existing in the T2-FLAIR MR image 50, and segment the first white matter lesion based on the hyper-intensity signal of the periventricular white matter. The second lesion estimating module 220 may detect the hyper-intensity signal of the deep white matter existing in the T2-FLAIR MR image 50, and segment the second white matter lesion based on the hyper-intensity signal of the deep white matter. In this case, the first lesion estimating module 210 and the second lesion estimating module 220 may be designed to have the same neural network structure (for example, the neural network in which the DenseNet structure is applied to the U-NET-based architecture), and may also be designed to have different neural network structures.

The processor 110 according to the alternative embodiment of the present disclosure may generate a mask 60 based on the information about the white matter lesion individually estimated through the first lesion estimating module 210 and the second lesion estimating module 220. For example, the mask 60 may include a first mask 61 displaying the hyper-intensity signal of the periventricular white matter in the T2-FLAIR MR image, a second mask 62 displaying the hyper-intensity signal of the deep white matter in the T2-FLAIR MR image, and a third mask 63 displaying the hyper-intensity signals of all white matters in the T2-FLAIR MR image. In this case, the third mask 63 may be generated by integrating the first mask 61 and the second mask 62, and the first mask 61 and the second mask 62 may be displayed with different colors so as to be visually discriminated.

Figure 5:
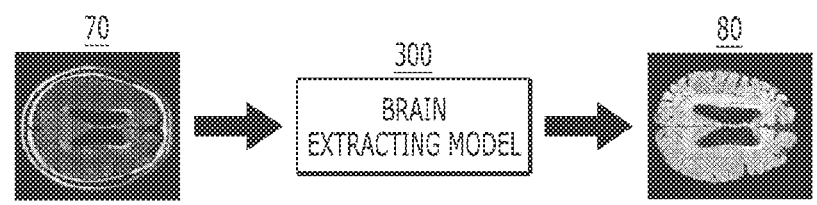
FIG. 5 is a block diagram illustrating a process of performing pre-processing on a medical image of the computing device according to the embodiment of the present disclosure.

FIG. 5 is a block diagram illustrating a process of performing pre-processing on a medical image of the computing device according to the embodiment of the present disclosure.

Referring to FIG. 5, the processor 110 of the computing device 100 according to the embodiment of the present disclosure may generate an image 80 in which a cerebral parenchyma region is extracted from a medical image 70 including a bone of the brain by using a brain extracting model 300. The processor 110 may extract a brain region including a white matter by using the brain extracting model 300 in order to remove the bone region of the brain included in the medical image 70. In general, in the case where the bone region of the brain is included in the image for determining the white matter lesion, there is a problem in that an error occurs in erroneously predicting the bone region of the brain as a hyper-intensity signal of the white matter. Accordingly, in order to solve the foregoing problem, the processor 110 may remove the bone region from the medical image 70 including the bone region of the brain, and generate an image 80 in which the cerebral parenchyma region including the white matter is extracted. In this case, the image 80 in which the cerebral parenchyma region including the white matter is extracted may be used as an input image of the model for determining or learning the white matter lesion. That is, the operation of the brain extracting model 300 may be performed in the training process as well as the process of inferring the neural network model for predicting the white matter lesion according to the embodiment of the present disclosure.

In the meantime, the brain extracting model 300 may also be the configuration discriminated from the neural network model 200 (see FIG. 4) for predicting the white matter lesion and be separately present, and may be one configuration included in the neural network model 200. For example, when the brain extracting model 300 is separately discriminated from the neural network model 200 and is present, the processor 110 may use the image 80 generated through the brain extracting model 300 as an input of the neural network model 200. When the brain extracting model 300 is one configuration of the neural network model 200, the neural network model 200 may generate an input image of the first lesion estimating module 210 (see FIG. 4) and the second lesion estimating module 220 (see FIG. 4) by operating the brain extracting model 300 as one pre-processing module.

Figure 6:
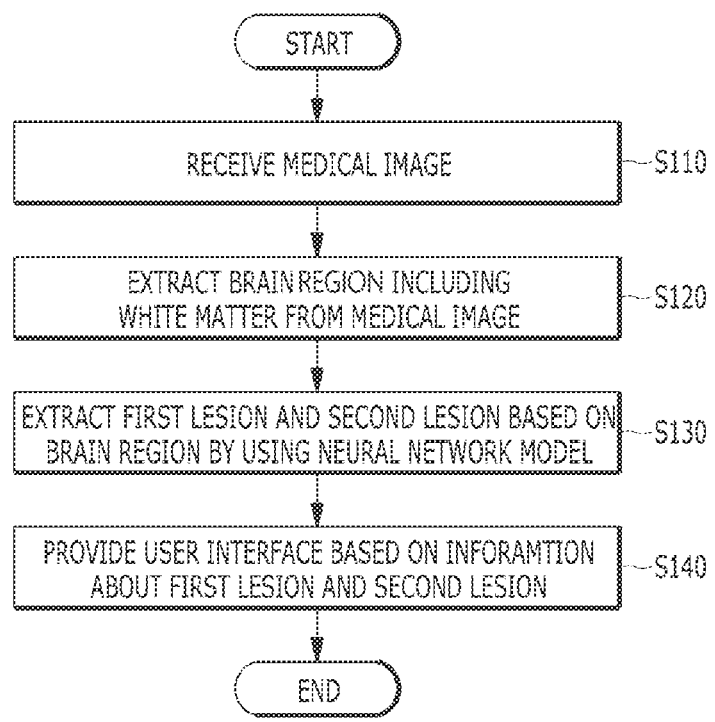
FIG. 6 is a flowchart for a method of detecting a white matter lesion based on a medical image according to still another embodiment of the present disclosure.

FIG. 6 is a flowchart for a method of detecting a white matter lesion based on a medical image according to still another embodiment of the present disclosure.

Referring to FIG. 6, in operation S110, the computing device 100 may receive a medical image for predicting a white matter lesion from a medical image photographing system. The medical image for predicting the white matter lesion may also be a three-dimensional MR image, and may also be a two-dimensional MR image slice. When the computing device 100 receives the three-dimensional MR image as the medical image, the computing device 100 may generate a two-dimensional MR image slice (for example, T2-FLAIR MR image slice) by processing the three-dimensional MR image. When the computing device 100 receives the two-dimensional MR slice as the medical image, the computing device 100 may use the two-dimensional MR slice as the input of the neural network model for predicting the white matter lesion without separate processing of the received medical image.

In operation S120, when a bone region of the brain is included in the medical image, the computing device 100 may remove the bone region of the brain from the medical image by using the brain extracting model and generate an image in which a cerebral parenchyma region is segmented, in order to improve accuracy of the prediction of the white matter lesion. In this case, the white matter region may be included in the cerebral parenchyma region. For example, when the computing device 100 receives the two-dimensional MR image slice including the bone region of the brain as the medical image, the computing device 100 may extract the cerebral parenchyma region including the white matter, and use the image in which the cerebral parenchyma region is extracted as the input of the neural network model for predicting the white matter lesion. When the bone region of the brain is not included in the medical image, operation S120 may also be omitted in the entire process.

In operation S130, the computing device 100 may discriminate and extract a first white matter lesion and a second white matter lesion based on the hyper-intensity signal of the white matter included in the medical image in which the cerebral parenchyma region is extracted by using the neural network model. The computing device 100 may generate a first mask including information about the first white matter lesion and displaying a hyper-intensity signal of a periventricular white matter, and a second mask including information about the second white matter lesion and displaying a hyper-intensity signal of a deep white matter. Further, the computing device 100 may generate a third mask displaying a hyper-intensity signal of the total white matters by matching the first mask and the second mask.

In operation S130, the computing device 100 may estimate volume information of each of the previously estimated first white matter lesion and second white matter lesion by considering information on a voxel dimension of the medical image received in operation S110. The computing device 100 may calculate first volume information about the first white matter lesion and second volume information about second white matter lesion based on x-axis, y-axis, and z-axis information about the voxel dimension of the medical image and the number of predetermined unit (for example, pixel) numbers for each of the previously estimated lesions. For example, the first volume information may be estimated based on an x-axis voxel value, a y-axis voxel value, and a z-axis voxel value included in the MR image information, and the number of pixels determined as the first white matter lesion. The second volume information may be estimated based on an x-axis voxel value, a y-axis voxel value, and a z-axis voxel value included in the MR image information, and the number of pixels determined as the second white matter lesion. The volume information may be derived as a result of the multiplication calculation of each voxel value and the number of pixels, but the calculation method is not limited thereto.

In operation S130, the computing device 100 may evaluate each of the first white matter lesion and the second white matter lesion based on the index representing severity of degeneration of the white matter and generate severity information. The severity information may include level information indicating how severe the degree of degeneration of the white matter lesion, classification information indicating whether the white matter lesion is in a serious state, and the like. For example, the computing device 100 may evaluate the severity of the lesion of the medical image based on the Fazekas scale that is an index for quantifying the hyper-intensity signal of the periventricular white matter and the hyper-intensity signal of the deep white matter according to severity. Predetermined reference information may be stored in the computing device 100 by utilizing a characteristic in which the number of pixels in which the hyper-intensity signal of the white matter is displayed is clearly distinguished in the medical image for each Fazekas scale divided by 0 to 3. The computing device 100 may generate severity classification information about the first white matter lesion by comparing the number of pixels determined as the first white matter lesion based on the predetermined reference information. The computing device 100 may generate severity classification information about the second white matter lesion by comparing the number of pixels determined as the second white matter lesion based on the predetermined reference information. The Fazekas scale is merely one example, and various indexes representing the degree of severity of the white matter lesion may be utilized in the present disclosure.

In operation S140, the computing device 100 may generate a user interface for outputting a predicted result of the white matter lesion by using the neural network model. In this case, the user interface may include regions for displaying information about the lesion in which the white matter is degenerated. For example, the user interface may include a first region for displaying the medical image (for example, the third mask generated in operation S120) displayed by the marker in which the hyper-intensity signal of the white matter is discriminated from the remaining regions. Further, the user interface may include a second region for displaying at least one of the volume information of each of the two white matter lesions and severity information of each of the two white matter lesions. The user interface generated by the computing device 100 may be transmitted to a user terminal and provided to a user.

Figure 7:
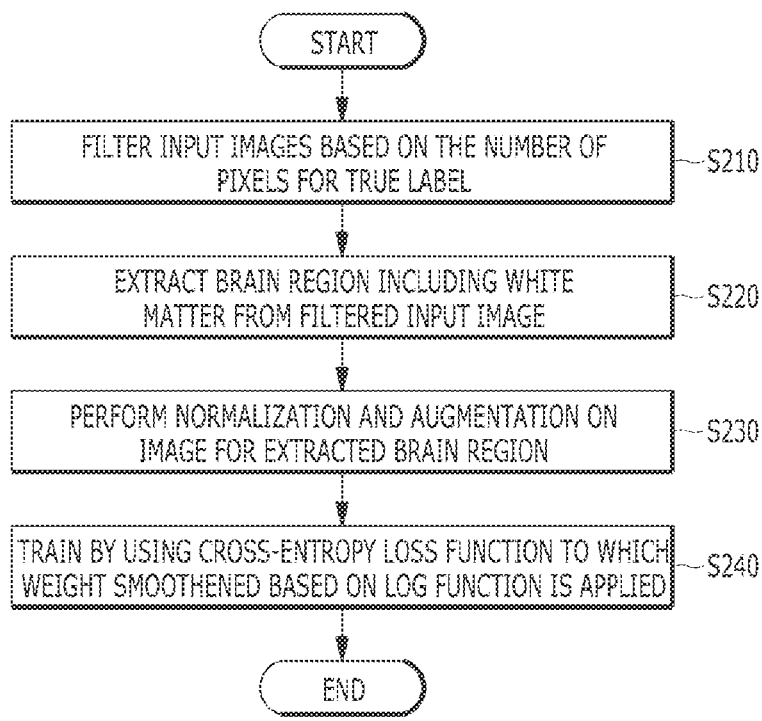
FIG. 7 is a flowchart illustrating a training process of a neural network model according to an embodiment of the present disclosure.

FIG. 7 is a flowchart illustrating a training process of a neural network model according to an embodiment of the present disclosure.

In operation S210, the computing device 100 may acquire training data of the neural network model to which each of a hyper-intensity signal of a periventricular white matter and a hyper-intensity signal of the deep white matter is labelled through communication with a database, an external terminal, and the like. The computing device 100 may filter the training data in order to improve training stability and efficiency of the neural network model. The computing device 100 may remove an image in which the number of pixels of a true label is equal to or smaller than a predetermined (or selected) number of pixels among the input images. In this case, the number of reference pixels for filtering may be varied depending on the type of hyper-intensity signal of the white matter. For example, when the number of pixels of the true label corresponding to the hyper-intensity signal of the periventricular white matter is equal to or smaller than 50, the computing device 100 may exclude the corresponding data from the training. Further, when the number of pixels of the true label corresponding to the hyper-intensity signal of the deep white matter is equal to or smaller than 15, the computing device 100 may exclude the corresponding data from the training. In the meantime, the foregoing filter may also be autonomously performed by the neural network model, or may also be performed through a separate module discriminated from the neural network model.

In operation S220, when the training data includes a bone region of the brain, the computing device 100 may remove the bone region of the brain from the training data and generate data in which a cerebral parenchyma region is segmented by using the brain extracting model in order to improve training accuracy. In this case, the white matter region may be included in the cerebral parenchyma region. When the bone region of the brain is not included in the training data, operation S220 may also be omitted in the entire process.

In operation S230, the computing device 100 may perform normalization for the filtered training data including the cerebral parenchyma region. Further, the computing device 100 may perform augmentation for solving the problem due to the insufficient training data and for robust training. For example, the computing device 100 may apply the augmentation method, such as affine transformation, flipping, and blurring to the normalized training data.

In operation S240, the computing device 100 may train the neural network model for predicting the white matter lesion by using the training data processed through operation S210 to S230 as an input of the neural network model. In this case, the cross-entropy loss function in which a weight smoothened based on the log function is applied may be used.

Figure 8:
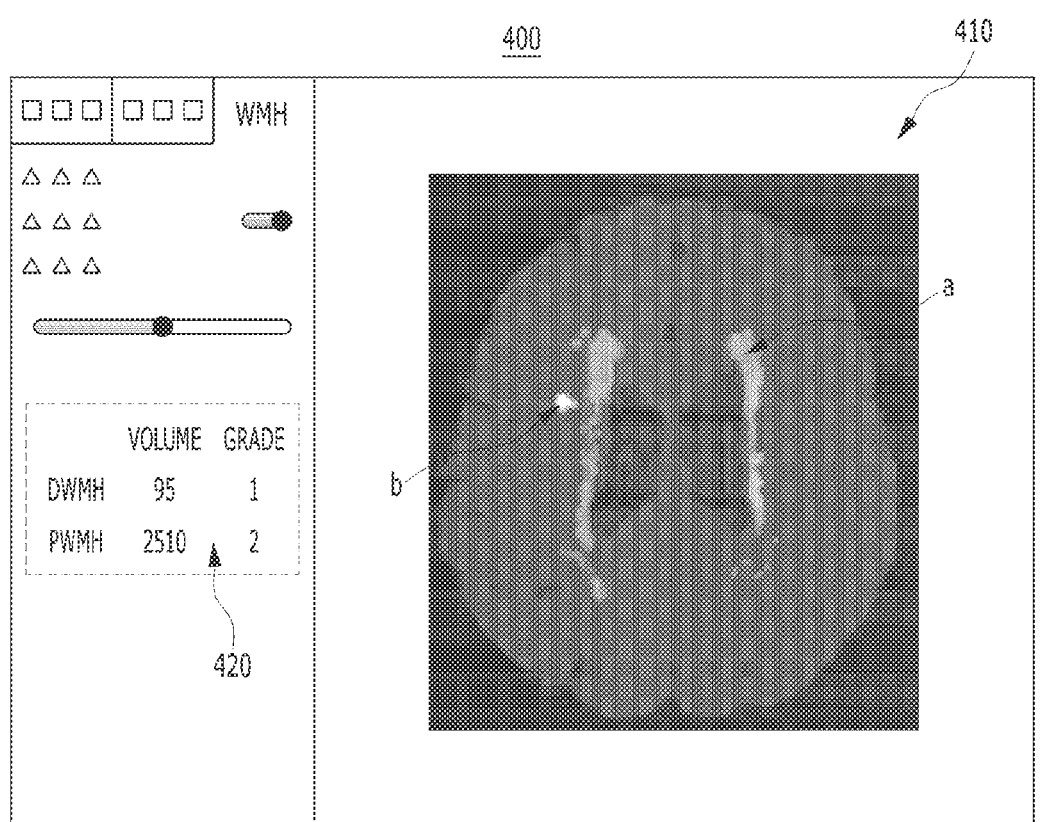
FIG. 8 is a conceptual diagram illustrating a user interface according to an embodiment of the present disclosure.

FIG. 8 is a conceptual diagram illustrating a user interface according to an embodiment of the present disclosure.

Referring to FIG. 8, a user interface 400 according to an embodiment of the present disclosure may include a first region 410 outputting a prediction result of the white matter lesion in the form of an image, and a second region 420 outputting a prediction result of the white matter lesion in the form of a text. For example, the first region 410 of the user interface 400 may display the whole white matter lesions in the form of the image based on the third mask that is the result of the matching of the first mask displaying the hyper-intensity signal of the periventricular white matter and the second mask displaying the hyper-intensity signal of the deep white matter. The second region 420 of the user interface 400 may display volume information and severity information of each of the first white matter lesion based on the hyper-intensity signal of the periventricular white matter and the second white matter lesion based on the hyper-intensity signal of the deep white matter.

The first region 410 may display the hyper-intensity signal (a) of the periventricular white matter and the hyper-intensity signal (b) of the deep white matter with different colors based on the T2-FLAIR MR image. FIG. 8 illustrates that the hyper-intensity signal (a) of the periventricular white matter and the hyper-intensity signal (b) of the deep white matter are displayed together, but the first region 410 may also selectively display the hyper-intensity signal (a) of the periventricular white matter and the hyper-intensity signal (b) of the deep white matter according to an external input applied from the user. The user may easily discriminate the two hyper-intensity signals of the white matter through the first region, thereby clearly discriminating and determining the Alzheimer's dementia and the vascular dementia.

The second region 420 may display each of the volume information and the severity information about the first white matter lesion and the volume information and the severity information about the second white matter lesion in the form of the text. The second region 420 may display the volume information and the severity information of the lesions organized in the form of a table so as for the user to easily recognize the information. FIG. 8 illustrates that the volume information and the severity information are displayed together, but the second region 420 may selectively display the volume information and the severity information of each lesion according to the external input applied from the user. In the user interface 400 of FIG. 8, the positions, the forms, and the like of the first region 410 and the second region 420 are merely illustrative, and those skilled in the art may understand that various modified examples are included.

In the meantime, according to an embodiment of the present disclosure, a computer recording medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network.

Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning). Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 9:
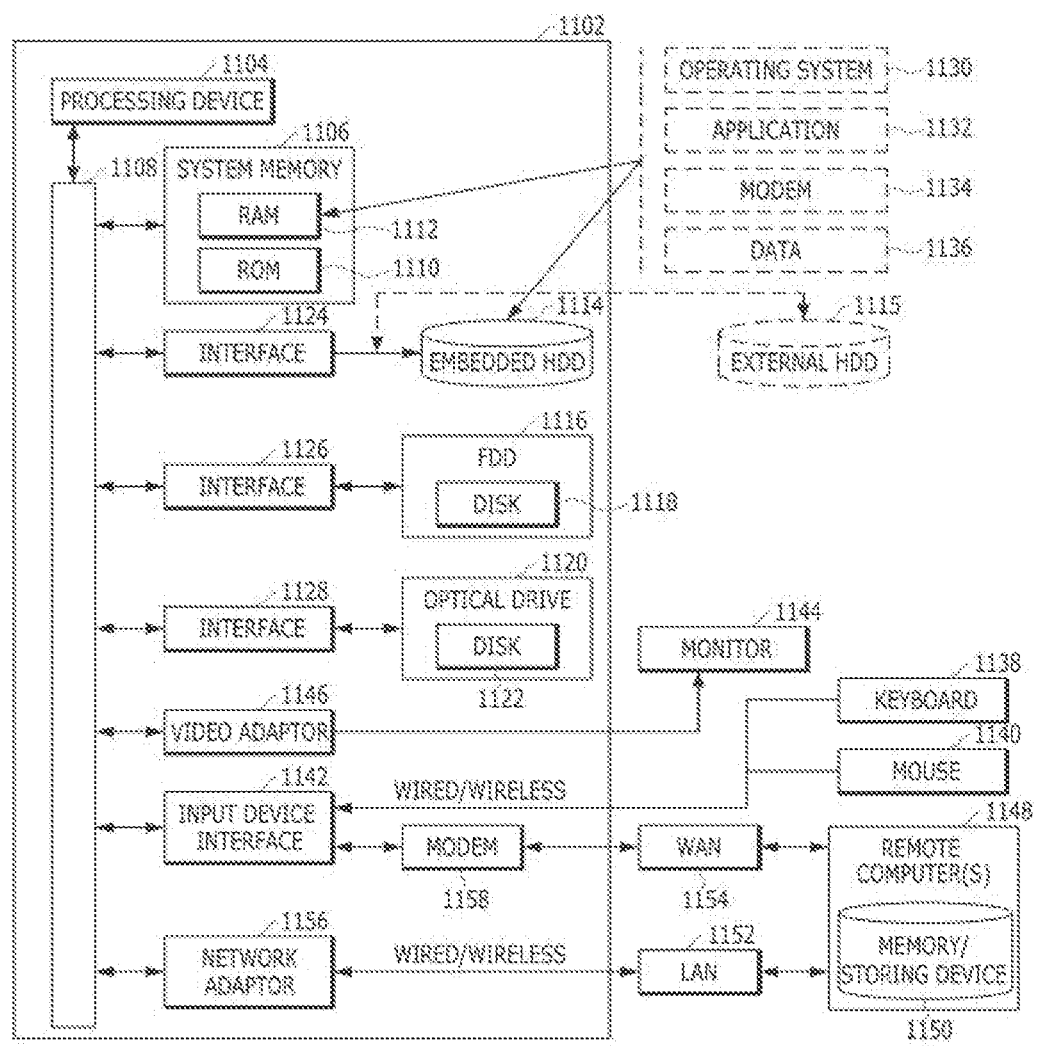
FIG. 9 is a schematic diagram of a computing environment according to an embodiment of the present disclosure.

FIG. 9 is a simple and normal schematic view of a computing environment in which the embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined (or selected) tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, temporary and non-temporary media, and movable and non-movable media implemented by a predetermined (or selected) method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined (or selected) other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined (or selected) processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined (or selected) data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined (or selected) media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is and other means configuring a communication link among computers may be used.

The computer 1102 performs an operation of communicating with predetermined (or selected) wireless devices or entities which are disposed and operated by the wireless communication, for example, the printer, a scanner, a desktop and/or a portable computer, a portable data assistant (PDA), a communication satellite, predetermined (or selected) equipment or place associated with a wireless detectable tag, and a telephone. This at least includes wireless fidelity (Wi-Fi) and Bluetooth wireless technology.

Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined (or selected) technologies and techniques. For example, data, instructions, commands, information, signals, bits, symbols, and chips which may be referred in the above description may be expressed by voltages, currents, electromagnetic waves, magnetic fields or particles, optical fields or particles, or predetermined (or selected) combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term manufactured article includes a computer program, a carrier, or a medium which is accessible by a predetermined (or selected) computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for detecting white matter lesions based on medical image, performed by a computing device including one or more processors, comprising:
receiving a medical image including at least one brain region; and
generating information for estimating a first white matter lesion and a second white matter lesion based on the medical image using a pre-trained neural network model,
wherein the generating the information for estimating the first white matter lesion and the second white matter lesion includes:
extracting a brain region including white matter from the medical image, wherein the brain region is a region from which a bone region of the brain has been removed; and,
generating first information for estimating the first white matter lesion based on the medical image, using a first lesion estimation module included in the neural network model; and
generating second information for estimating the second white matter lesion based on the medical image, using a second lesion estimation module included in the neural network model,
wherein the first information is generated based on the extracted brain region, using the first lesion estimation module and the second information is generated based on the extracted brain region, using the second lesion estimation module.

2. The method of claim 1, wherein the first white matter lesion is estimated based on periventricular white matter hyperintensity, and the second white matter lesion is estimated based on deep white matter hyperintensity.

3. The method of claim 1, wherein the neural network model is trained based on an image in which true label is greater than a predetermined number of pixels among input images.

4. The method of claim 1, wherein the neural network model is trained using a cross-entropy loss function with smoothed weights based on a log function.

5. The method of claim 1, further comprising:
generating a first mask including information for the first white matter lesion; and
generating a second mask including information for the second white matter lesion.

6. The method of claim 5, further comprising:
generating a third mask including information for an entire lesion in which a white matter is degenerated, by matching the first mask and the second mask.

7. The method of claim 1, further comprising:
generating either first volume information for the first white matter lesion or second volume information for the second white matter lesion, based on information for voxel dimension of the medical image and a number of predetermined units for each of the estimated lesions.

8. The method of claim 1, further comprising:
calculating a severity of each of the first white matter lesion or the second white matter lesion, based on an index indicating a severity of a white matter degeneration.

9. The method of claim 1, further comprising:
generating a user interface including a mask generated based on each of the first white matter lesion and the second white matter lesion, volume information, and degeneration severity information, and
wherein the user interface includes:
  a first region for displaying an image of a lesion in which a white matter is degenerated, based on the mask generated based on each of the first white matter lesion and the second white matter lesion; or
  a second region for displaying at least one of the volume information and the degeneration severity information.

10. The method of claim 9, wherein each of the first white matter lesion and the second white matter lesion is displayed in different colors, in the first region.

11. A computing device for detecting white matter lesions based on medical image, comprising:
a processor including at least one core;
a memory including program codes executable in the processor; and
a network circuit for receiving a medical image including at least one brain region,
wherein the processor is configured to:
  generate first information for estimating a first white matter lesion based on the medical image using a first lesion estimation module included in a pre-trained neural network model, and,
  generate second information for estimating a second white matter lesion based on the medical image using a second lesion estimation module included in the neural network model,
  wherein the at least one brain region includes white matter and is a region from which a bone region of the brain has been removed; and
  wherein the first information is generated based on the at least one brain region, using the first lesion estimation module and the second information is generated based on the at least one brain region, using the second lesion estimation module.

12. A user terminal, comprising:
a processor including at least one core;
a memory;
a network circuit for receiving a user interface including information for a lesion in which a white matter is degenerated, from a computing device; and
an output circuit for providing the user interface,
wherein the user interface comprising at least one of the following:
  a first region for displaying an image of the lesion in which the white matter is degenerated, based on the mask generated by the computing device based on each of a first white matter lesion and a second white matter lesion; or
  a second region for displaying at least one of volume information and degeneration severity information, which are generated by the computing device based on each of the first white matter lesion and the second white matter lesion,
wherein the first white matter lesion is estimated based on a brain region extracted from a medical image using a first lesion estimation module included in a neural network model; and
wherein the second white matter lesion is estimated based on the extracted brain region using a second lesion estimation module included in the neural network mode,
wherein the brain region includes white matter and is a region from which a bone region of the brain has been removed.

* * * * *